United States Patent [19]
Minderlein

[11] Patent Number: 5,654,634
[45] Date of Patent: Aug. 5, 1997

[54] METHOD FOR DETECTING GAPS TO BE BRIDGED IN THE POWER SUPPLY OF AN ELECTRIC RAIL VEHICLE

[75] Inventor: Erich Minderlein, Vellmar, Germany

[73] Assignee: Siemans Aktiengesellschaft, Munich, Germany

[21] Appl. No.: 550,212

[22] Filed: Oct. 30, 1995

[30] Foreign Application Priority Data

Oct. 29, 1994 [DE] Germany .................. 44 38 701.6

[51] Int. Cl.$^6$ .................. B61K 9/10; G01N 27/82
[52] U.S. Cl. .................. 324/218; 324/217; 191/8; 191/6; 340/988
[58] Field of Search .................. 191/2, 3, 6, 8; 340/988; 324/218, 217, 718

[56] References Cited

U.S. PATENT DOCUMENTS

| | | | |
|---|---|---|---|
| 2,527,001 | 10/1950 | Drake | 324/218 |
| 2,535,353 | 12/1950 | Drake | 324/218 |

Primary Examiner—Kenneth A. Wieder
Assistant Examiner—Jose M. Solis
Attorney, Agent, or Firm—Herbert L. Lerner; Laurence A. Greenberg

[57] ABSTRACT

A method for detecting gaps to be bridged in a power supply of an electric rail vehicle includes continuously sensing at least one conductor rail for gaps with at least one contact signal transmitter travelling ahead of a plurality of electrically interconnected real current collectors, as seen in the direction of travel of the rail vehicle, with signal information obtained being stored. An instantaneous contact situation between the real current collectors and the conductor rail is determined from the memory contents. Positions of a virtual current collector travelling in advance are formed for each real current collector from the memory contents, with the distances between the contact signal transmitter and the virtual current collectors being such that a necessity to change over the traction power converter into the regenerative braking mode is indicated as soon as all of the virtual current collectors meet a gap in the conductor rail. The instantaneous contact situation between the virtual current collectors and the conductor rail is determined from the memory contents. Signals which result from the contact situation of the virtual current collectors indicate a start and signals which result from the contact situation of the real current collectors indicate an end, of a gap to be bridged in the conductor rail.

2 Claims, 2 Drawing Sheets

METHOD FOR DETECTING GAPS TO BE BRIDGED IN THE POWER SUPPLY OF AN ELECTRIC RAIL VEHICLE

BACKGROUND OF THE INVENTION

Field of the Invention

The invention relates to a method for detecting gaps to be bridged in the power supply of an electric rail vehicle.

In rail vehicles which are fed through a so-called third rail, i.e. conductor rails, serious interruptions in the feeding of power occur, for example in the region of points or shunts, intersections and sectioning points. As a result, in addition to the unavoidable loss of tractive force there is an interruption in the train's power supply system which is apparent, for example, in the failure of the lighting. Usually, when a gap in a conductor rail occurs a fault detection is triggered, which causes storage capacitors of a power feeder circuit to be discharged and a switch for the train's power supply system to be opened. This results in frequent starting up of drives and an increased failure rate for components such as motors, lighting systems, high-speed circuit-breakers and charging circuits for storage capacitors, etc. Furthermore, there is a disadvantageous time period after the end of the gap in the conductor rail, until the power converters serving to feed the drive motors are operational again and the train's power supply system is connected up again.

In order to overcome that problem, a method for bridging gaps in the power supply of electric, power-converter-fed rail vehicles is proposed in German Published, Non-Prosecuted Application DE 44 23 692 A1. In that publication it is assumed that a rail vehicle is provided at its two ends with current collectors for making contact with the power supply. During a time period in which the rail vehicle travels a distance that as far as possible is only slightly smaller than the distance between the front and rear current collectors, the traction power converter is changed over from a travel mode into a regenerative braking mode, i.e. a generating operating state or from the braking mode into the regenerative braking mode, as soon as a current collector which is at the front as seen in the direction of travel is not in contact with the power supply.

By virtue of that method it is possible for the rail vehicle to be capable of travelling at any speed over gaps in the power supply, which are unavoidable as a result of the topology of the track (points or shunts, intersections, isolating or separating points), with minimum interruption of the tractive force and without interruption, or with only a short interruption, of the train's power supply when the rail vehicle enters a gap in the power supply, the length of the gap and the length of the subsequent power supply (conductor rails) are unknown. Nevertheless, a reliable change-over of the power flux is ensured without jolting within the train configuration and unnecessary interruption in the train's power supply. At the same time, use is made of the fact that a reliable change-over of the power flux is possible as long as the current collector which is at the back as seen in the direction of travel is still in contact with the power supply when a gap in the power supply occurs. The components of the train configuration are protected by the method, which results in an increased service life. The comfort of passengers in the train configuration is increased since gaps in the conductor rail are travelled over without jolting and there is no unnecessary failure of the lighting system.

SUMMARY OF THE INVENTION

It is accordingly an object of the invention to provide a method for detecting gaps to be bridged in the power supply of an electric rail vehicle, which overcomes the hereinafore-mentioned disadvantages of the heretofore-known methods of this general type and which can even be used when more than two current collectors are used at the same location.

With the foregoing and other objects in view there is provided, in accordance with the invention, a method for detecting gaps to be bridged in a power supply of an electric rail vehicle, which comprises:

a) continuously sensing at least one conductor rail for gaps with at least one contact signal transmitter travelling ahead of a plurality of electrically interconnected real current collectors, as seen in a direction of travel of a rail vehicle, and storing signal information obtained per given travel length unit as memory contents;

b) determining an instantaneous contact situation between the real current collectors and the conductor rail from the memory contents as a function of the given travel length unit and given distances between the contact signal transmitter and the individual real current collectors;

c) forming positions of a virtual current collector travelling in advance for each real current collector from the memory contents as a function of the given distances between the contact signal transmitter and the individual real current collectors, the relevant speed of the rail vehicle and a given change-over time for changing over a traction power converter of the rail vehicle into a regenerative braking mode, the contact signal transmitter and the virtual current collectors being spaced apart by distances causing a necessity to change over the traction power converter into the regenerative braking mode to be indicated as soon as all of the virtual current collectors meet a gap in the conductor rail;

d) determining an instantaneous contact situation between the virtual current collectors and the conductor rail from the memory contents as a function of the given travel length unit and the distances between the contact signal transmitter and the individual virtual current collectors;

e) logically interconnecting signals resulting from the contact situation of the virtual current collectors through an OR condition indicating a start of a gap to be bridged in the conductor rail; and f) logically interconnecting signals resulting from the contact situation of the real current collectors through an OR condition indicating an end of a gap to be bridged in the conductor rail.

The advantages which can be achieved with the invention are in particular the fact that the method permits a precise and rapid decision as to if and when a change-over into the regenerative braking mode is necessary when a gap in the conductor rail occurs. In systems with a single conductor rail, only one contact signal transmitter per direction of travel of the rail vehicle is required. Nevertheless, the instantaneous contact situation for all of the current collectors (whether there is contact between the current collector and the conductor rail or whether there is a gap present in the conductor rail) is determined and taken into account. As a result, a saving in terms of contact signal transmitters and control inputs is obtained.

An unnecessarily early change-over into the regenerative braking mode and an unnecessarily long duration of the regenerative braking mode is prevented. At relatively short conductor rail interruptions a change-over into the regenerative braking mode is completely prohibited. This is because all of the current collectors of the rail vehicle are connected to one another electrically so that, despite the occurrence of a gap in the conductor rail, the rail vehicle can be fed in an electrically uninterrupted way. If such an uninterrupted contact situation is detected, there is advantageously no change-over into the regenerative braking mode. As a result, there is an increase in kilometric performance and comfort. Since the decision regarding the change-over is made by the vehicle-side logic, the driver of the vehicle is relieved of the need to comply with procedure regulations in the area of gaps in the conductor rail.

The method can be used universally for different current collector configurations and conductor rail configurations. The number of current collectors can be as high as desired.

In accordance with a concomitant mode of the invention, there is provided a method which comprises storing signal information of the contact signal transmitter with a shift register having binary memory elements being written, as a function of the travel length unit, with binary values corresponding to "conductor rail present" and "gap in conductor rail", and shifting the memory contents of each memory element by one position whenever a travel length unit is passed over.

Other features which are considered as characteristic for the invention are set forth in the appended claims.

Although the invention is illustrated and described herein as embodied in a method for detecting gaps to be bridged in the power supply of an electric rail vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
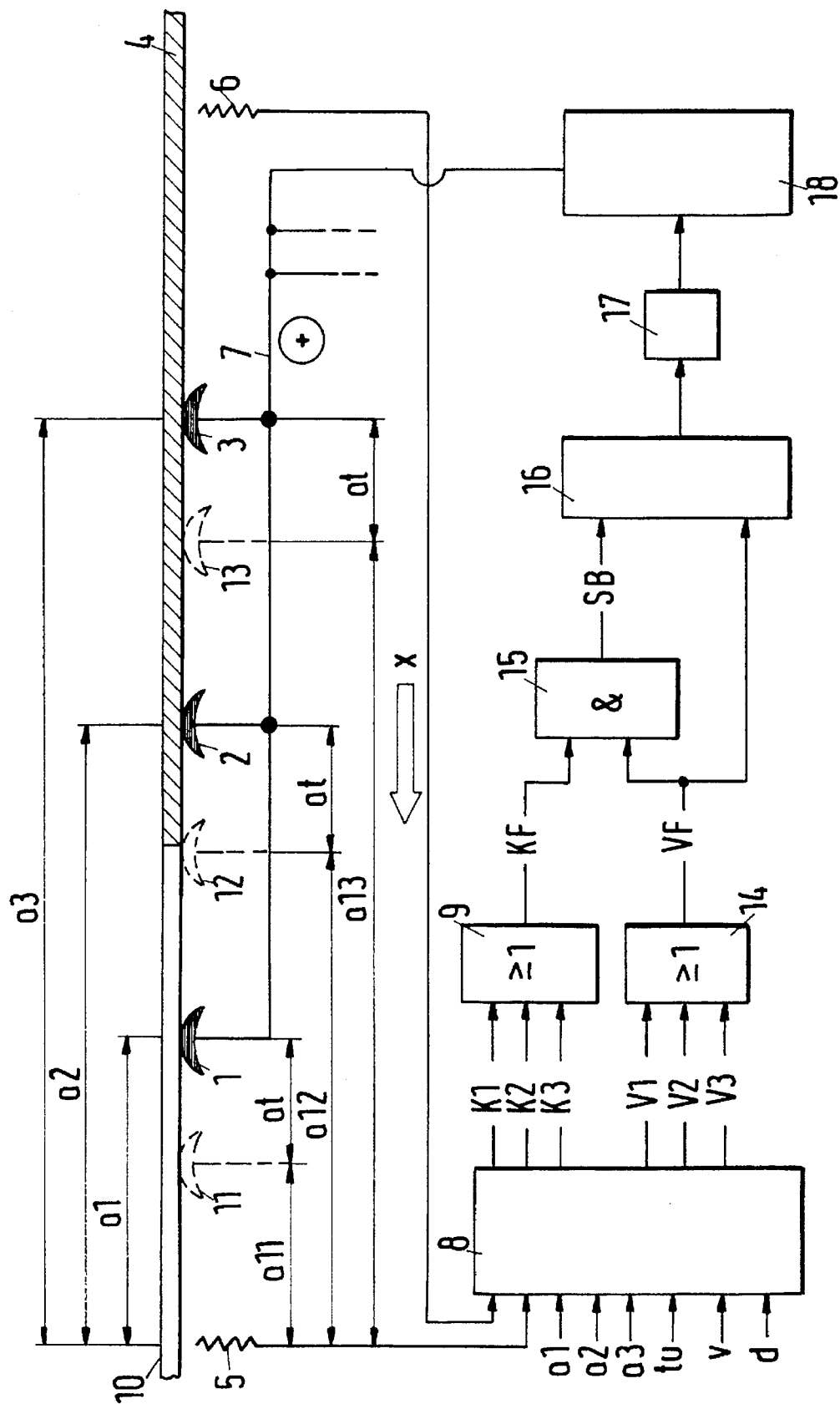
FIG. 1 is a block circuit diagram used for explaining the method for detecting gaps to be bridged in the power supply of an electric rail vehicle, having current collectors and a conductor rail shown in a fragmentary, diagrammatic, sectional view.

Referring now to the figures of the drawing in detail and first, particularly, to FIG. 1 thereof, there is seen a block circuit diagram for explaining the method for detecting gaps to be bridged in the power supply of an electric rail vehicle. First, second and third current collectors 1, 2 and 3 which make contact with a conductor rail 4 can be seen in a fragmentary, sectional illustration. The direction of travel of the rail vehicle is indicated by an arrow X=forward travel. A first contact signal transmitter 5 (for forward travel) is disposed in front of the first current collector 1 as seen in the direction of travel and a second contact signal transmitter 6 (for backward travel) is disposed behind the third current collector 3 as seen in the direction of travel. Signals of the contact signal transmitters 5, 6 have a logical value H when an uninterrupted conductor rail is detected and they have a logical value L in the region of gaps in the conductor rail.

Electric connection terminals of all of the current collectors 1, 2, 3 are connected to one another and form a positive connection 7 of the power supply for feeding electric components of the rail vehicle (German Published, Non-Prosecuted Application DE 44 23 692 A1). Distances between the contact signal transmitter 5 and the current collectors 1, 2 and 3 are designated by reference symbols a1, a2 and a3, respectively.

The signals of the contact signal transmitters 5, 6 are supplied to a memory/computer 8. The distances a1, a2, a3, a given or prescribed change-over time tu for changing over a traction power converter into a regenerative braking mode, an instantaneous speed v of the rail vehicle and a travel length unit d, for which an individual binary memory element of the memory is to be made available, are present at the memory/computer 8. Of course, the distances between the contact signal transmitter 6 and the current collectors 1, 2, 3 are also present at the memory/computer 8, which is significant for backward travel. In order to preserve clarity, this is not shown in FIG. 1. When the rail vehicle is travelling backwards, these distances take the place of the distances a1, a2, a3.

The memory/computer 8 has a shift register (RAM) into which the signal information of the contact signal transmitter 5 (during forward travel) or of the contact signal transmitter 6 (during backward travel) are read in continuously during operation. Binary memory elements of the shift register are written, as a function of the travel length unit d, with binary values H corresponding to "conductor rail present" and binary values L corresponding to "gap in conductor rail". The memory contents of each memory element are shifted on by one position whenever a travel length unit d is passed over. The travel length units d can be derived from the speed v or can be determined through the use of a separate position sensor on the rail vehicle. The minimum number of required memory elements is dependent on the given or prescribed travel length unit d and the greatest distance between a contact signal transmitter and a current collector (in the example this is the distance a3). The smaller the travel length unit d given or prescribed, the more memory elements are necessary with the same distance between the contact signal transmitter and the current collector. On the other hand, as the travel length unit d becomes smaller, the quality and dynamics of the method improve.

The memory/computer 8 determines the instantaneous contact situation of the current collectors 1, 2, 3 (contact with conductor rail present/gap in conductor rail) from the memory contents (permanently read-in signal information of the contact signal transmitter) as a function of the travel length unit d and the distances a1, a2, a3, and outputs signals k1, k2 or k3 of the current collector 1, of the current collector 2 or of the current collector 3 to an OR logic connection element 9, wherein the signals correspond to the instantaneous contact situation. If the signal k1 has the binary information H, the first current collector 1 is in contact with the conductor rail 4 at that moment. However, if the signal k1 has the binary information L, there is a gap in the conductor rail below the current collector 1 at that moment. The same applies for the further signals k2 and k3.

In the exemplary embodiment according to FIG. 1 a gap 10 in the region of the conductor rail 4 is shown so that the signals k2 and k3 have the value H and the signal k1 has the value L.

The memory/computer 8 forms the position of a virtual current collector 11, 12 or 13, travelling in advance, for each real current collector 1, 2 or 3 from the memory contents (permanently read-in signal information of the contact signal transmitter), as a function of the distances a1, a2, a3, of the instantaneous speed v and of the given or prescribed change-over time tu. The position of these virtual current collectors 11, 12 and 13 which are travelling in advance is determined by distances a11, a12 and a13 between the contact signal transmitter 5 and the virtual current collectors 11, 12 and 13. The distance a11 is obtained by reducing the distance a1 by a virtual distance at. In the same way, the distances a2 and a3 are reduced by the virtual distance at in order to obtain the distances a12 and a13. The virtual distance at corresponds to the distance which the rail vehicle that is moving at the instantaneous speed v travels during the change-over time tu. The position of the virtual current collectors 11, 12, 13 is thus such that they indicate the necessity of changing over the traction power converter into the regenerative braking mode as soon as they meet a gap in the conductor rail, i.e. as soon as a gap 10 in the conductor rail 4 is located at a virtual current collector.

The memory/computer 8 determines the instantaneous contact situation of the virtual current collectors 11, 12, 13 from the memory contents (permanently read-in signal information of the contact signal transmitter) as a function of the travel length unit d and the distances a11, a12, a13 and it outputs signals V1, V2 and V3 corresponding to the instantaneous contact situation of the virtual current collector 11, of the virtual current collector 12 or of the virtual current collector 13 to an OR logic connection element 14. If the signal V1 has the binary value H, the virtual current collector 11 is in contact with the conductor rail at that moment. However, if the signal V1 has the binary information L, there is a gap in the conductor rail underneath the virtual current collector 11 at that moment. The same applies for the further signals V2, V3. In the case of the conductor rail 4 with the gap 10 shown in the exemplary embodiment, the signals V1 and V2 have the value L and the signal V3 has the value H.

Thus a signal VF which has the value H when the regenerative braking mode is not necessary and which has the value L when the regenerative braking mode must be initiated can be obtained from the output side of the OR logic connection element 14. The signal VF is supplied to a first input of an AND logic connection element 15 and to an evaluation device 16. The evaluation device brings about the change over of the traction power converter into the regenerative braking mode and the change over back out of the regenerative braking mode to the normal mode given or prescribed by the driver of the locomotive. A signal KF of the OR logic connection element 9 is fed to a second input of the AND logic connection element 15. The signal KF generally corresponds to the instantaneous contact situation of the positive connection 7 of the power supply and has the value H when at least one current collector 1 or 2 or 3 is in contact with the conductor rail 4. The signal KF has the value L if there is no current collector in contact with the conductor rail at that moment.

When required, as a function of its input signals, the AND logic connection element 15 outputs a signal SB with the value H to the evaluation device 16 in order to terminate the regenerative braking mode. If the signal SB has the value L, the evaluation device 16 is not influenced.

The output side of the evaluation device 16 acts on a control device 17 of the traction power converter 18. The traction power converter 18 draws its power from the positive connection 7 during the normal mode. Reference should be made to the embodiments in German Published, Non-Prosecuted Application DE 44 23 692 A1, in particular from page 5, paragraph 2, to page 9, according to which the evaluation device 16 determines a regenerative braking desired value for the traction power inverter, as a function of the required performance of the train's power supply system, the separate requirements of the electric components of the rail vehicle and the speed V, and realizes a slope-shaped change-over from the motor operating state into the generator operating state.

Figure 2:
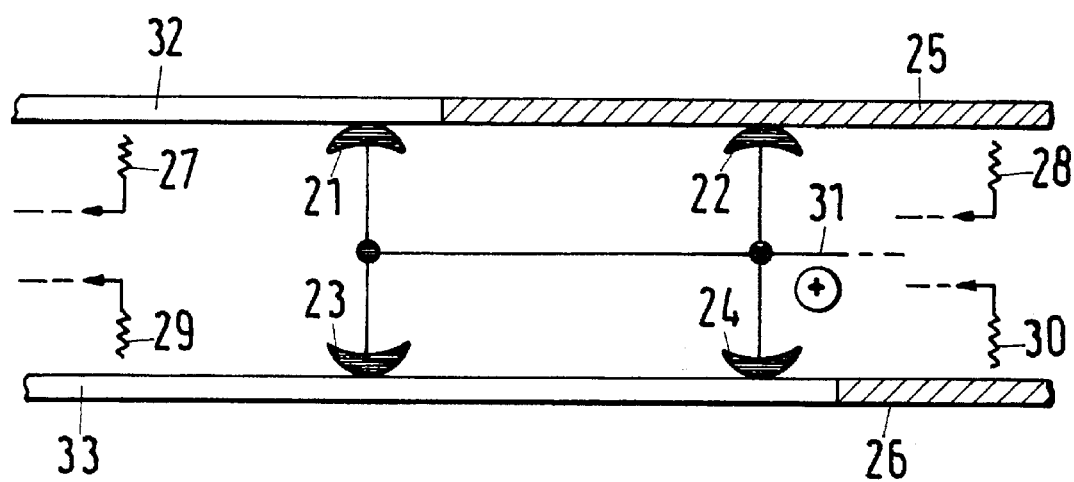
FIG. 2 is a fragmentary, sectional view showing an alternative configuration of conductor rails.

An alternative configuration of conductor rails is shown in FIG. 2. In this exemplary embodiment, it is assumed that the system can have a right-hand or a left-hand conductor rail or a right-hand and a left-hand conductor rail, depending on the topographical requirement. Accordingly, the rail vehicle is equipped with right-hand and left-hand current collectors. Two right-hand current collectors 21, 22 and two left-hand current collectors 23, 24 can be seen. All of the current collectors 21 to 24 are connected to one another and form a positive connection 31 of the power supply of the rail vehicle. The current collectors 21, 22 and 23, 24 make contact with respective conductor rails 25 and 26. In order to detect gaps 32 in the conductor rail 25 or gaps 33 in the conductor rail 26, contact signal transmitters 27, 28 and 29, 30 are provided. The signals of these contact signal transmitters 27 to 30 are in turn supplied to a memory/computer. The mode of operation of the detection method is as described for FIG. 1, with the difference that current collectors are to be taken into account on two sides instead of current collectors on one side, and the signals of two contact signal transmitters per direction of travel are to be taken into account instead of the signals of one contact signal transmitter per direction of travel, in each case by connection to a common shift register.

In the case of backward travel of the rail vehicle, the opposite end of the memory area of the memory/computer 8, for example the most significant memory element of the contact signal transmitter 6 or 28/30 located on the other side is written in and the shifting inside the shift register takes place in the other direction, in accordance with the other direction of travel. The virtual current collectors are formed of a corresponding reading out in advance of the other direction of travel.

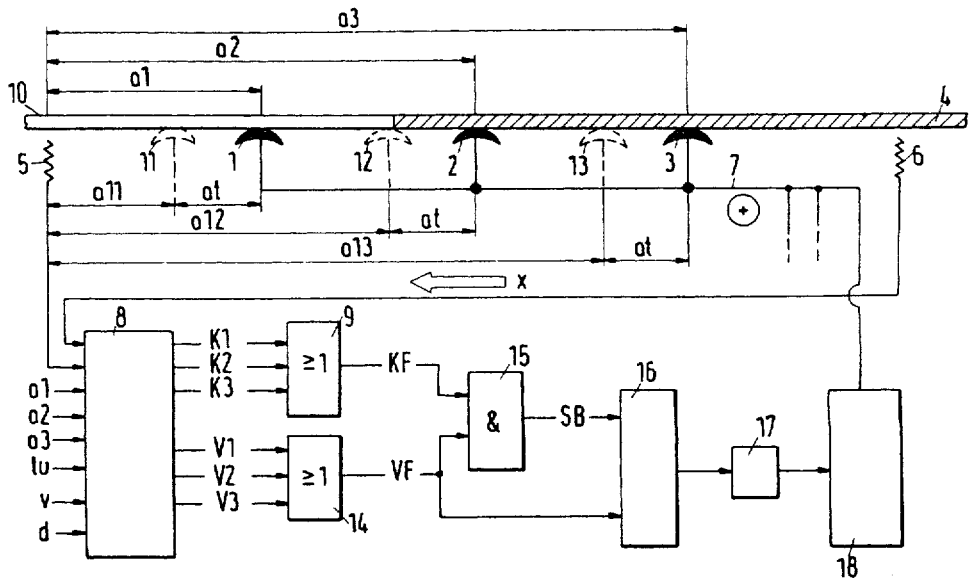

I claim:

1. A method for detecting gaps to be bridged in a power supply of an electric rail vehicle, which comprises:
    a) continuously sensing at least one conductor rail for gaps with at least one contact signal transmitter travelling ahead of a plurality of electrically interconnected real current collectors, as seen in a direction of travel of a rail vehicle, and storing signal information obtained per given travel length unit as memory contents;
    b) determining an instantaneous contact situation between the real current collectors and the conductor rail from the memory contents as a function of the given travel length unit and given distances between the contact signal transmitter and the individual real current collectors;
    c) forming positions of a virtual current collector travelling in advance for each real current collector from the memory contents as a function of the given distances between the contact signal transmitter and the individual real current collectors, the relevant speed of the rail vehicle and a given change-over time for changing over a traction power converter of the rail vehicle into a regenerative braking mode, the contact signal transmitter and the virtual current collectors being spaced apart by distances causing a necessity to change over the traction power converter into the regenerative braking mode to be indicated as soon as all of the virtual current collectors meet a gap in the conductor rail;

d) determining an instantaneous contact situation between the virtual current collectors and the conductor rail from the memory contents as a function of the given travel length unit and the distances between the contact signal transmitter and the individual virtual current collectors;

e) logically interconnecting signals resulting from the contact situation of the virtual current collectors through an OR condition indicating a start of a gap to be bridged in the conductor rail; and f) logically interconnecting signals resulting from the contact situation of the real current collectors through an OR condition indicating an end of a gap to be bridged in the conductor rail.

2. The method according to claim 1, which comprises storing signal information of the contact signal transmitter with a shift register having binary memory elements being written, as a function of the travel length unit, with binary values corresponding to "conductor rail present" and "gap in conductor rail", and shifting the memory contents of each memory element by one position whenever a travel length unit is passed over.

* * * * *

UNITED STATES PATENT AND TRADEMARK OFFICE
CERTIFICATE OF CORRECTION

PATENT NO. : 5,654,634
DATED : August 5, 1997
INVENTOR(S) : Erich Minderlein

It is certified that error appears in the above-identified patent and that said Letters Patent is hereby corrected as shown below:

The title page should be deleted to appear as per attached.

Signed and Sealed this

Ninth Day of June, 1998

*Attest:*

BRUCE LEHMAN

*Attesting Officer*     *Commissioner of Patents and Trademarks*

United States Patent [19]

Minderlein

[11] Patent Number: 5,654,634

[45] Date of Patent: Aug. 5, 1997

[54] METHOD FOR DETECTING GAPS TO BE BRIDGED IN THE POWER SUPPLY OF AN ELECTRIC RAIL VEHICLE

[75] Inventor: Erich Minderlein, Vellmar, Germany

[73] Assignee: ABB Patent GmbH, Mannheim, Germany

[21] Appl. No.: 550,212

[22] Filed: Oct. 30, 1995

[30] Foreign Application Priority Data

Oct. 29, 1994 [DE] Germany .................. 44 38 701.6

[51] Int. Cl.$^6$ .................. B61K 9/10; G01N 27/82
[52] U.S. Cl. .................. 324/218; 324/217; 191/8; 191/6; 340/988
[58] Field of Search .................. 191/2, 3, 6, 8; 340/988; 324/218, 217, 718

[56] References Cited

U.S. PATENT DOCUMENTS 2,527,001 10/1950 Drake .................. 324/218
2,535,353 12/1950 Drake .................. 324/218

Primary Examiner—Kenneth A. Wieder
Assistant Examiner—Jose M. Solis
Attorney, Agent, or Firm—Herbert L. Lerner; Laurence A. Greenberg

[57] ABSTRACT

A method for detecting gaps to be bridged in a power supply of an electric rail vehicle includes continuously sensing at least one conductor rail for gaps with at least one contact signal transmitter travelling ahead of a plurality of electrically interconnected real current collectors, as seen in the direction of travel of the rail vehicle, with signal information obtained being stored. An instantaneous contact situation between the real current collectors and the conductor rail is determined from the memory contents. Positions of a virtual current collector travelling in advance are formed for each real current collector from the memory contents, with the distances between the contact signal transmitter and the virtual current collectors being such that a necessity to change over the traction power converter into the regenerative braking mode is indicated as soon as all of the virtual current collectors meet a gap in the conductor rail. The instantaneous contact situation between the virtual current collectors and the conductor rail is determined from the memory contents. Signals which result from the contact situation of the virtual current collectors indicate a start and signals which result from the contact situation of the real current collectors indicate an end of a gap to be bridged in the conductor rail.

2 Claims, 2 Drawing Sheets